United States Patent [19]

Barnes et al.

[11] Patent Number: 4,961,949
[45] Date of Patent: Oct. 9, 1990

[54] METHOD OF PRODUCING A COILED FOOD PRODUCT

[75] Inventors: Douglas J. Barnes, Cambridgeshire; Eduardo Savoni, Northants, both of England

[73] Assignee: Unilever Patent Holdings B.V., Rotterdam, Netherlands

[21] Appl. No.: 288,864

[22] Filed: Dec. 23, 1988

[30] Foreign Application Priority Data

Dec. 23, 1987 [GB] United Kingdom ............... 8730034

[51] Int. Cl.⁵ .............................................. A23P 1/00
[52] U.S. Cl. ................................... 426/518; 426/297; 426/500; 426/537; 83/932
[58] Field of Search ............... 426/138, 282, 289, 297, 426/637, 500, 518, 284; 83/932

[56] References Cited

U.S. PATENT DOCUMENTS

| 3,798,343 | 3/1974 | Vitale | 426/524 |
| 3,904,772 | 9/1975 | Moegle | 426/641 |
| 4,387,111 | 6/1983 | Müllender | 426/637 |
| 4,780,328 | 10/1988 | Akesson et al. | 426/284 |

FOREIGN PATENT DOCUMENTS 1185745 6/1968 United Kingdom .

Primary Examiner—Donald E. Czaja
Assistant Examiner—Mary S. Mims
Attorney, Agent, or Firm—Cushman, Darby & Cushman

[57] ABSTRACT

Method for producing a coiled food product by slicing a body of brittle food material to form a curled slice and, if necessary, further coiling said slice to obtain a coiled product. Preferably frozen food materials are sliced and optionally filled.

10 Claims, 4 Drawing Sheets

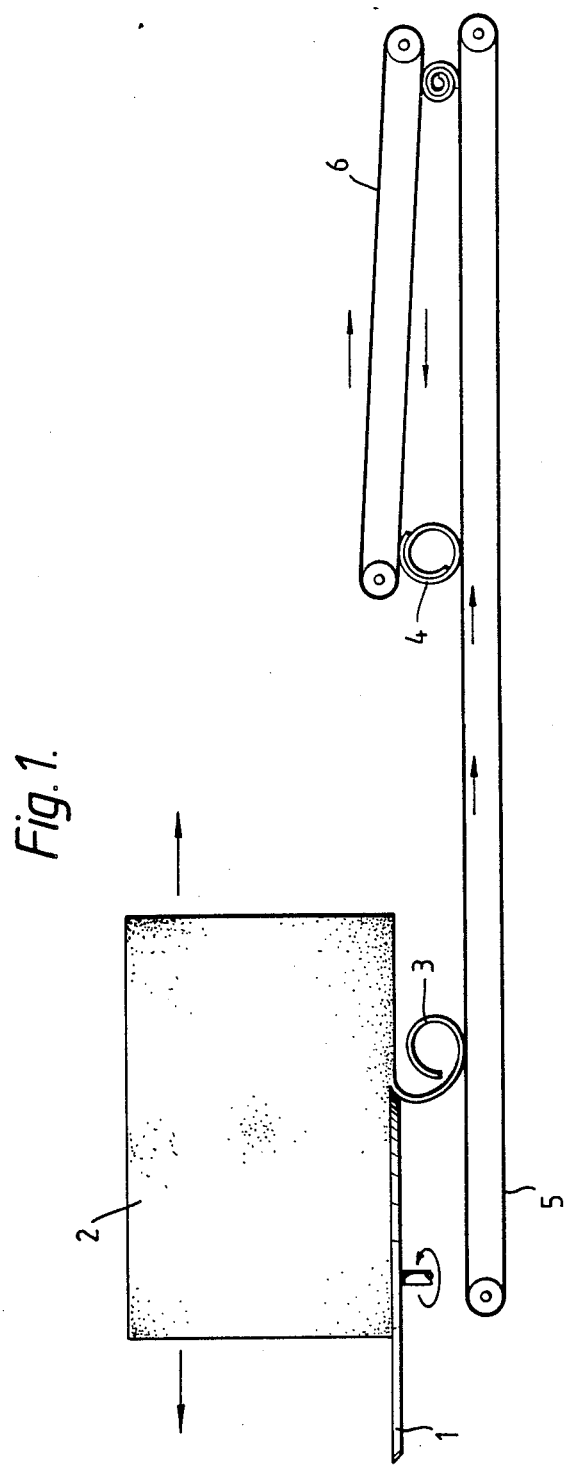

METHOD OF PRODUCING A COILED FOOD PRODUCT

The invention relates to a method of producing a coiled food product.

Coiled food products are generally produced by forming a slice of an edible food material, optionally applying a filling to the slice, and thereafter spirally winding the slice. Such methods are for instance disclosed in U.S. Pat. Nos. 3,904,772, 3,798,343, GB No. 1 596 271, GB No. 377 766 and EP No. 215 143. These methods are however less suitable for producing coiled products from brittle materials, as these materials tend to break during winding.

It is an object of the present invention to provide a method for producing coiled food products which do not suffer from the above-mentioned disadvantage. Furthermore, it is also an object of the present invention to provide a method which enables coiled food products to be produced conveniently on an industrial scale.

It has now been found that the ability to cause curling of brittle food products when they are sliced can advantageously be used in the production of coiled food products. Therefore the invention relates to a method of producing a coiled food product by slicing a body of brittle food material to form a curled slice and, if necessary, further coiling said slice to obtain the coiled food product.

In this specification the expression curled slice refers to a slice showing some form of curling and the expression coiled refers to a slice showing at least 360° of curling. Preferably a cross-section of the coiled product will show at least two, more preferably at least three, most preferably at least five wound layers of food material.

Brittle food materials are materials which are relatively resistant to compression but substantially less resistant to extension.

Due to the brittleness of the food material, microfractures will be formed during slicing thereof, in the convex side of the slice which is subject to extension. This is the side of the slice which is in contact with the slicing device, which is preferably a knife. These microfractures are present over the entire outer surface of the slice and allow the formation of a curled slice. The curled slice will either be coiled or will require further coiling to form the final coiled product.

It is believed that several parameters determine the extent to which the slice is initially curled during slicing and therefore whether further coiling will be necessary to form the final product.

The first of these parameters is the temperature of the food material. The resistance to extension will generally decrease as the temperature of the food material decreases and therefore slices formed at relatively high temperatures will generally show less initial curling than slices formed at lower temperatures. At extremely low temperatures too many microfractures can form and this may result in breakage of the product and unsatisfactory curling.

The optimum temperature of the food material depends on the type of material. For a block of fish mince a temperature of −3° to −5° C. results in a coiled food product upon slicing, whereas for comminuted meat in block form complete coiling upon slicing can be obtained when the meat is at a temperature of −5° to −7° C. For ice-cream and dough materials even lower temperatures are preferred to effect a coiled food product.

The type of food material also affects the extent of initial curling. Fish products tend to be less resistant to coiling than meat products, whereas ice-cream products are more resistant to coiling than meat products but are about as resistant as dough products. The less resistant a food material is to coiling the greater extent of initial curling. The formation of a coiled ice-cream product will therefore generally require a low processing temperature e.g. about −15° C.

When a rotating circular knife is used as the slicing device, it is preferred that the slice is cut with the edge of the body of the food material parallel to the tangent of the blare at the cutting point.

The slicing angle of the knife used in slice formation will also affect the initial extent of curling. Preferably, the slicing angle will lie between 10° and 60° and most preferably between 15° and 45° to the plane of the material being sliced. This is either the angle of inclination of the blade to the food material, or, if a knife with a bevelled edge is used, the angle of inclination of the bevelled edge to the food material. An increase in the slicing angle will generally result in more curling. If desired, a serrated knife can be used or the blade of the knife can be provided with a curling plate, attached adjacent to the blade, which provides a receptacle into which the coiled food product forms.

The thickness of the slice may also influence the extent of curling. Thin slices curl more than thick slices. Preferably the thickness of the slice is less than 10 mm, more preferably less than 5 mm, most preferably about 2.5 mm. The surface area of the coiled slice is preferably) more than 25 cm$^2$, preferably more than 100 cm$^2$. Suitable food materials which can be used are for instance fish, meat, mashed potato, vegetables, ice-cream, water ice, dough or mixtures thereof etc. Preferably the food materials are isotropic. When an isotropic material is under stress, the material reacts uniformly and as a result the microfractures are evenly spread over the entire surface thus avoiding breakage. Frozen fish mince is therefore preferred over fish fillet. Variations in temperature, material, slice thickness, slicing angle etc. can result in products having specific shapes. It is believed that on the basis of the above given indications it is possible to vary the above-mentioned parameters to obtain initial curling as desired.

The product, after slicing is, if necessary, eventually further coiled to form a coiled product. This further coiling can be effected by any conventional means. The occurrence of microfractures in the outer side of the slice will generally prevent breakage during this further coiling. Preferred methods of further coiling are by means of, for example, a stainless steel flexible chain mail, or two counter-rotating conveyor belts.

If desired, the product may be filled prior to or after further coiling.

After preparation, the coiled food product may be subjected to further processing. It may be coated with a breading or batter mixture. Alternatively, it can be transversely sliced into smaller portions. The coiled food product may be packed, frozen and stored prior to consumption. In one embodiment the product is put on a stick for ease of consumption.

FIG. 1 shows a schematic elevational view of a device for carrying out the method according to the invention.

FIGS. 2a–2d each show a schematic elevational view of one step in a method according to the invention.

Figure 2A:
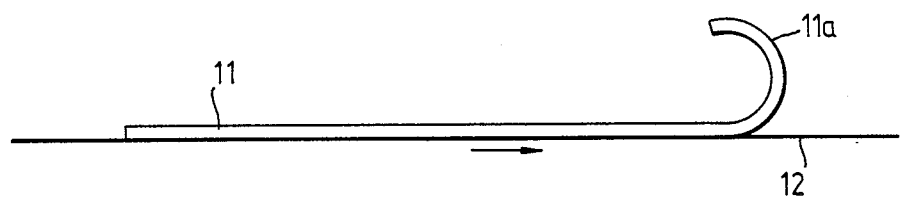

Referring to FIG. 1, the device comprises a rotating knife 1 with a bevelled edge, having a slicing angle of 20°, located above a conveyor belt 5. A rolling pressing belt 6 is located above the belt 5 at a position remote from the rotating knife 1. In use, a cylindrical shaped block 2 of, for example, tempered fish, at a temperature of −4° C. is located above the rotating knife. The block of food material is capable of being moved from a first position, where it is supported on a table (not shown) below the level of the knife, and a second position where it is supported on the knife. The rotating knife 1 slices a slice 3 having a thickness of 2.5 mm from the block 2. The slice curls during slicing to form a curled slice 4 which is transported by means of the conveyor belt 5 towards the rolling pressing belt 6 arranged above the conveyor belt 5 for further coiling the product. The final fish coil is hardened prior to further transverse slicing, for instance by freezing the outer surface thereof. After slicing the hole in the center of the coiled food product can be filled with an edible material. The product can then be coated for example with breadcrumbs and packed ready for storage prior to consumption.

Referring to FIGS. 2a–2d, FIG. 2a shows a meat slice 11 on a conveyor belt 12. In use, the meat slice 11 is formed by slicing a log-shaped body of comminuted meat, at a temperature of −5° C. Under these conditions only slight curling occurs. Nevertheless the entire surface 11a which was extended during slicing is covered with microfractures which allows further coiling of the food material with that surface on the outside of the coil.

Figure 2B:
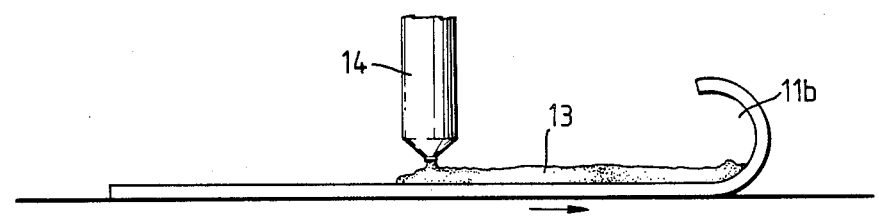

FIG. 2b shows the application of a filling 13, such as, for example, a savory sauce, from a sauce dispenser 14 onto the curled slice 11. In an alternative embodiment a cylindrical billet of frozen food material, for example a sauce material, is placed in the area 11b which will form the center of the curled slice. This supports the slice during further coiling.

Figure 2C:
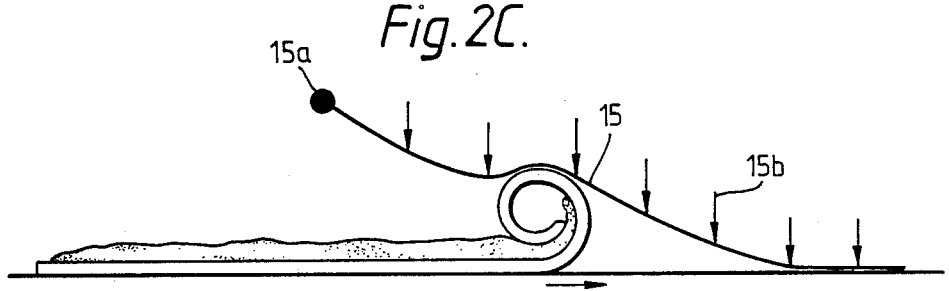
Figure 2D:
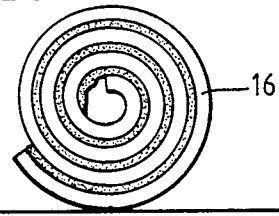

FIG. 2c shows a stainless steel flexible chain mail 15 in contact with the filled curled slice. The chain mail is fixed from a bar 15a transverse to the belt 12 so that the weight of the chain mail bears down on the food material in the direction of the arrows 15b so as to come into frictional contact with the coiled food. In the use the belt 12 transports the curled slice to the chain mail. The slice passes under the chain mail and the leading edge of the chain mail picks up the slice and causes it to curl, as described in our copending European Patent Application No. 88 311235, to form a coiled filled product 16 as shown in FIG. 2d. The product 16 shows 7–8 layers of meat and interleaving filling layers. The product may be further processed prior to consumption as described above.

FIGS. 3–6 illustrate the influence of the orientation of the slicing knife with respect to the material to be sliced.

Figure 3:
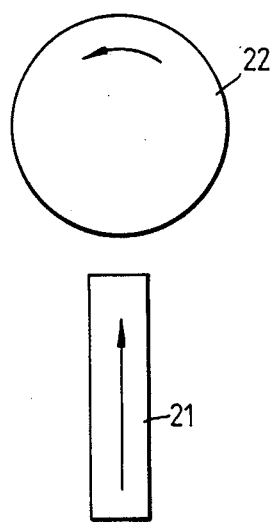
FIGS. 3, 3a, 5 and 5a are schematic plan views of a cylindrical shaped block of the food material and a slicing knife.
Figure 3A:
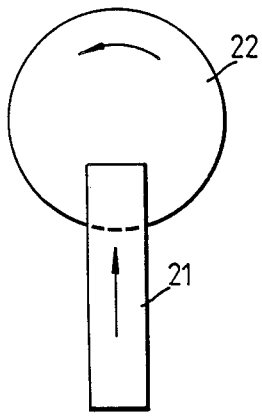
Figure 4:
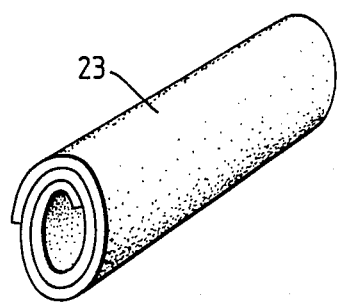
FIGS. 4 and 6 are perspective views of a coiled food product prepared by the method according to the invention.

FIG. 3 shows a cylindrical body of food material 21 and a rotating knife 22 orientated perpendicular to the food body. The food material is passed over the rotating knife 22 as shown in FIG. 3a and a slice of food material is cut from the cylindrical body 21. The slice forms the coiled product 23 shown in FIG. 4.

Figure 5:
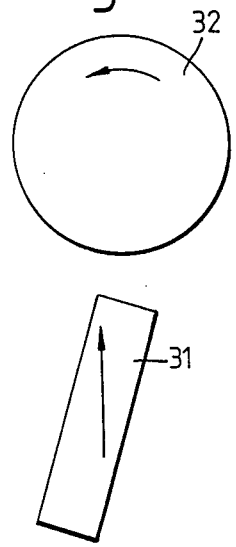
Figure 6:
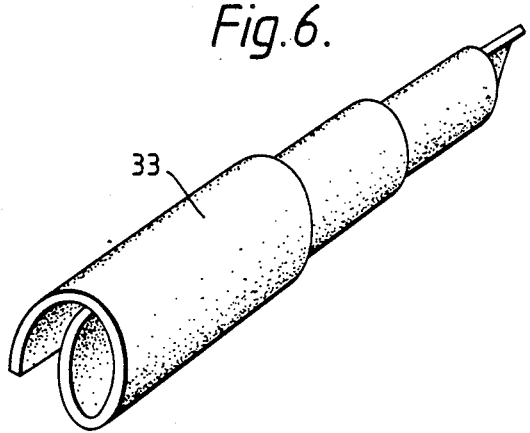
Figure 5A:
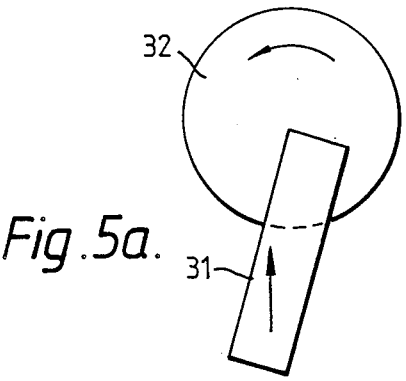

FIG. 5 shows a cylindrical body of food material 31 and a rotating knife 32 orientated at an angle to the food body The food material is passed over the rotating knife 32 as shown in FIG. 5a and a slice of food material is cut from the cylindrical body 31. The slice forms the telescopically coiled food product 33 shown in FIG. 6.

Figure 7:
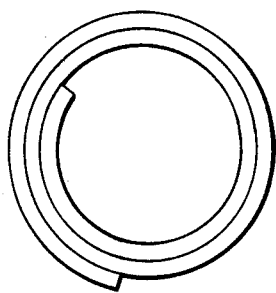
FIGS. 7 and 8 are end views of coiled food products prepared according to the invention.
Figure 8:
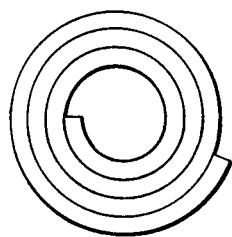

FIGS. 7 and 8 illustrate the effect of the slicing angle of the slicing knife. FIG. 7 shows a curl which is directly obtained by slicing with a knife having an angle of 15° to the plane of the material being sliced. FIG. 8 shows a curl which is directly obtained by slicing with a knife having an angle of 20° to the plane of the material being sliced. Apparently the slice obtained using a knife having an increased slicing angle curls more.

Figure 9:
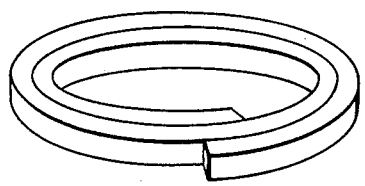
FIG. 9 shows a perspective view of a product obtained by slicing a coiled food product as shown in FIG. 7.

FIG. 9 shows a product obtained by further transverse slicing a coiled product such as for instance shown in FIG. 7.

We claim:

1. A method of manufacturing a coiled food product comprising the steps of:
   (a) contacting a body of a brittle food material with a slicing device to form a curled slice, wherein the angle of the slicing device with respect to the surface of the food material is between 10° and 60° and
   (b) further curling the curling slice by a curling means to provide the coiled food product.

2. A method according to claim 1, wherein the brittle food material is frozen.

3. A method according to claim 1, wherein the brittle food material is selected from the group consisting of fish, dough, potato, vegetable, water-ice, ice-cream, meat materials or mixtures thereof.

4. A method according to claim 1, wherein the thickness of the curled slice is less than 10 mm.

5. A method according to claim 1, wherein the surface area of the slice is greater than 25 cm$^2$.

6. A method according to claim 1, wherein the product is filled from a dispenser after slicing or after further coiling.

7. A method according to claim 1, wherein the product is coated with breadcrumbs prior to consumption.

8. A method according to claim 1, wherein the coiled food product is further sliced in the transverse direction with respect to the axis of coiling.

9. A method according to claim 1, wherein the brittle food material is coiled around a substantially cylindrical block of filling material.

10. A method according to claim 1, wherein the slicing device is a rotating knife and the curled slice is cut with the edge of the body of the brittle food material placed in a position that is parallel with respect to the tangent of the blade of the knife at the cutting point.

* * * * *